US012796811B2

(12) United States Patent
Cheng et al.

(10) Patent No.: US 12,796,811 B2
(45) Date of Patent: Nov. 17, 2026

(54) CABINET

(71) Applicant: Fulian Precision Electronics (Tianjin) Co., LTD., Tianjin (CN)

(72) Inventors: Kun-Yang Cheng, New Taipei (TW); Kai-Sheng Chang, New Taipei (TW); Chen-Hao Su, New Taipei (TW); Fang-Xing Yang, Tianjin (CN); Liang Gao, Tianjin (CN); Wen-Tzu Chen, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 127 days.

(21) Appl. No.: 18/962,110

(22) Filed: Nov. 27, 2024

(65) Prior Publication Data

US 2026/0076477 A1 Mar. 19, 2026

(30) Foreign Application Priority Data

Sep. 14, 2024 (CN) ......................... 202411296259.5

(51) Int. Cl.
*A47B 88/407* (2017.01)
*E05B 65/46* (2017.01)

(52) U.S. Cl.
CPC ............ *A47B 88/407* (2017.01); *E05B 65/46* (2013.01)

(58) Field of Classification Search
CPC ...... A47B 88/407; E05B 65/46; H05K 7/1489
USPC ............................................... 312/333, 330.1
See application file for complete search history.

(56) References Cited

U.S. PATENT DOCUMENTS

| | | | | |
|---|---|---|---|---|
| 3,619,019 | A * | 11/1971 | Hepker | E05B 65/46 312/215 |
| 4,003,614 | A * | 1/1977 | Geer | E05B 65/46 292/240 |
| 4,230,351 | A * | 10/1980 | Bisbing | E05C 3/08 292/DIG. 49 |
| 6,579,029 | B1 * | 6/2003 | Sevde | H05K 7/1414 403/321 |
| 8,496,275 | B2 * | 7/2013 | Garneau | E05B 47/0012 292/201 |
| 8,538,226 | B2 * | 9/2013 | Makrides-Saravanos | G02B 6/44526 385/139 |
| 8,991,949 | B2 * | 3/2015 | Kyle | G06F 1/183 312/348.3 |
| 9,508,392 | B2 * | 11/2016 | Kyle | G11B 33/08 |
| 10,368,460 | B1 * | 7/2019 | Yang | H05K 7/1411 |
| 10,383,248 | B1 * | 8/2019 | Chen | H05K 7/18 |
| 10,920,457 | B2 * | 2/2021 | Jordan | E05B 65/46 |
| 11,576,273 | B2 * | 2/2023 | Li | H05K 5/023 |

(Continued)

*Primary Examiner* — Daniel J Troy
*Assistant Examiner* — Timothy M Ayres
(74) *Attorney, Agent, or Firm* — ScienBiziP, P.C.

(57) ABSTRACT

A cabinet is disclosed in the present application. The cabinet includes a cabinet body, a chassis, a drawer module, and a locking mechanism. The chassis is provided in the cabinet body and can be withdrawn from the cabinet body. The drawer module is provided in the chassis and withdrawable from the chassis. The locking mechanism includes a first rotating member and a locking member. The first rotating member is rotatably disposed in the chassis and is in contact with the cabinet body. The locking member is movably disposed in the chassis to be located at or away from a rotation path of the first rotation member.

18 Claims, 8 Drawing Sheets

(56) References Cited

U.S. PATENT DOCUMENTS 11,613,908 B2 * 3/2023 Tower .................. H05K 5/0221 292/66
11,659,680 B2 * 5/2023 Lu ........................ H05K 7/1489 361/679.02
11,665,840 B1 * 5/2023 O'Donnell ........... H05K 7/1409 361/801
11,770,912 B2 * 9/2023 Mohanasundaram ....................... H05K 7/1492 361/725
11,805,898 B2 * 11/2023 Larkner .............. G07F 17/0092
11,898,378 B2 * 2/2024 Wang ................... H05K 7/1411
12,031,363 B2 * 7/2024 Yeh ....................... E05B 1/0046
12,414,256 B2 * 9/2025 An ....................... H05K 7/1489
12,426,191 B2 * 9/2025 Kumarasamy ....... H05K 7/1401
12,484,181 B1 * 11/2025 An ....................... H05K 7/1489
2005/0238421 A1 * 10/2005 Doerr ...................... E05C 19/06 403/322.4
2007/0149018 A1 * 6/2007 Gunther ............... H05K 7/1414 439/160
2015/0012760 A1 * 1/2015 Shichi .................. H05K 7/1492 713/300
2015/0048625 A1 * 2/2015 Weusten ................. E05B 65/46 292/137
2015/0156902 A1 * 6/2015 Terwilliger .......... H05K 7/1487 403/321
2015/0163946 A1 * 6/2015 Kyle .................... H05K 7/1418 312/348.4
2016/0150659 A1 * 5/2016 Chen ....................... E05B 65/46 292/126
2019/0200476 A1 * 6/2019 Konovalov .......... H05K 7/1489
2020/0080578 A1 * 3/2020 Wang ................... H05K 7/1417
2023/0144465 A1 * 5/2023 Chia .................... H05K 7/1409 312/223.2
2024/0215192 A1 * 6/2024 Lee ...................... H05K 7/1401
2024/0279962 A1 * 8/2024 Wang ...................... E05B 65/46
2024/0407124 A1 * 12/2024 Lin ...................... H05K 7/1401
2025/0287520 A1 * 9/2025 Tsorng ................. H05K 7/1489
2025/0374470 A1 * 12/2025 Wu ........................ H05K 5/023
2026/0075728 A1 * 3/2026 Yeh ...................... H05K 5/0221

* cited by examiner

CABINET

FIELD

The present application relates to the field of servers, particularly to a cabinet.

BACKGROUND

The server cabinet usually includes a cabinet body, a chassis, and a drawer module, the chassis is disposed in the cabinet body and is withdrawn from the cabinet in a certain direction, while the drawer module is disposed in the chassis and is withdrawn from the chassis in that direction. When the chassis is withdrawn from the cabinet body and the drawer module is pulled out from the chassis, the chassis and the drawer module are in a suspended state at the same time, and the center of gravity of the chassis and the drawer module as a whole is far away from the cabinet body, which leads to a larger moment of force on the cabinet body, easily leading to deformation or even fracture damage to the cabinet body.

Therefore, improvement is desired.

BRIEF DESCRIPTION OF THE DRAWINGS

Implementations of the present application will now be described, by way of embodiments, with reference to the attached figures.

DETAILED DESCRIPTION

Figure 1:
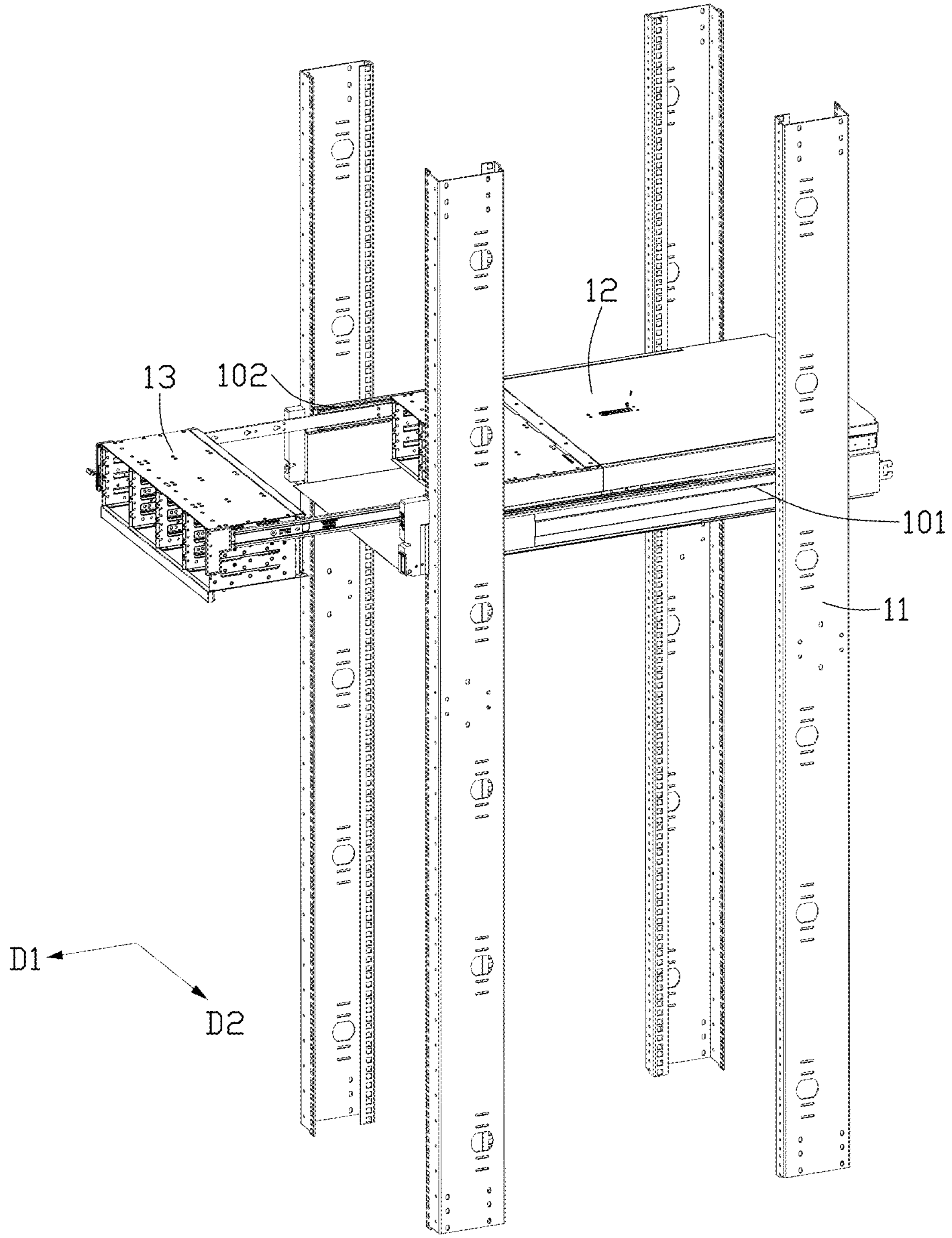
FIG. 1 is a schematic diagram of a chassis retained in a cabinet body and a drawer module withdrawn from the chassis of an embodiment of the present application.

The technical solutions in the embodiments of the present application will be described below in conjunction with the accompanying drawings in the embodiments of the present application, and the described embodiments are only a portion of the embodiments of the present application and not all of the embodiments.

When a component is considered to be "connected" to another component, it may be directly connected to another component or there may be a centered component between the component and another component.

Unless otherwise specified, the term "plurality" as used herein refers to two or more.

In the embodiment of the present application, the words "first" and "second" are only used to distinguish different objects and cannot be understood as indicating or implying relative importance, or as indicating or implying order. For example, the first application and the second application are used to distinguish different applications, not to describe the specific order of applications.

The term "orthogonal" is used to describe an ideal state between two components. In the actual state of production or use, an approximately orthogonal state may exist between the two components.

The term "parallel" is used to describe an ideal state between two components. In the actual state of production or use, an approximate parallelism between the two components may exist between the two components.

Unless otherwise defined, all technical and scientific terms used herein have the same meaning as commonly understood by those skilled in the art belonging to the present application. The terms used herein in the specification of the present application are used only for the purpose of describing specific embodiments and are not intended to limit this application.

The present application provides a cabinet, the cabinet includes a cabinet body, a chassis, a drawer module, and a locking mechanism, the chassis is disposed in the cabinet body, and the chassis is withdrawable from the cabinet body along a first direction; the drawer module is disposed in the chassis, and the drawer module is withdrawable from the chassis along the first direction; and the locking mechanism includes a first rotating member and a locking member, the first rotating member is rotationally disposed in the chassis and the first rotating member is abutted against the cabinet body, a rotation plane of the first rotating member is parallel to the first direction; the locking member is movably disposed in the chassis along a second direction to be located in or away from a rotation path of the first rotating member, and the second direction is orthogonal to the rotation plane of the first rotating member; a state of the first rotating member against the cabinet is a locked state, and the chassis is restricted from being withdrawn from the cabinet body under the locked state; the first rotating member is separated from the cabinet body during rotation, a state in which the first rotating member is separated from the cabinet body is an unlocked state, and the chassis is allowed to be withdrawn from the cabinet body under the unlocked state; and when the drawer module is withdrawn from the chassis, the first rotating member is abutted against the cabinet body, the locking member is located in the rotation path of the first rotating member, and the cabinet body cooperates with the locking member to limit rotation of the first rotating member.

Before the drawer module is withdrawn from the chassis, the chassis can be withdrawn from the cabinet body normally by rotating the first rotating member and separating it from the cabinet body. After the drawer module is withdrawn from the cabinet, the first rotating member is connected to the cabinet body and the locking member is located in the rotation path of the first rotating member, the cabinet body and the locking member cooperate to limit the rotation of the first rotating member, and at this time, the first rotating member is limited to rotate and not be able to be transformed from a locked state to an unlocked state, and the chassis is limited to be withdrawn from the cabinet body, and is conducive to making the chassis and the center of gravity of the drawer module as a whole be close to the cabinet body, thereby reducing the possibility of deformation or even breakage of the cabinet during use.

Embodiments of the present application will be described below in connection with the accompanying drawings. The following embodiments and features in the embodiments may be combined with each other without conflict.

FIG. 1 illustrates a cabinet 10 in accordance with an embodiment of the present application.

The cabinet 10 includes a cabinet body 11, a chassis 12, and a drawer module 13. The chassis 12 is disposed in the cabinet body 11, and the chassis 12 can be withdrawn from the cabinet body 11 along a first direction D1, the drawer module 13 is disposed in the chassis 12, and the drawer module 13 can be withdrawn from the chassis 12 along the first direction D1.

Figure 2:
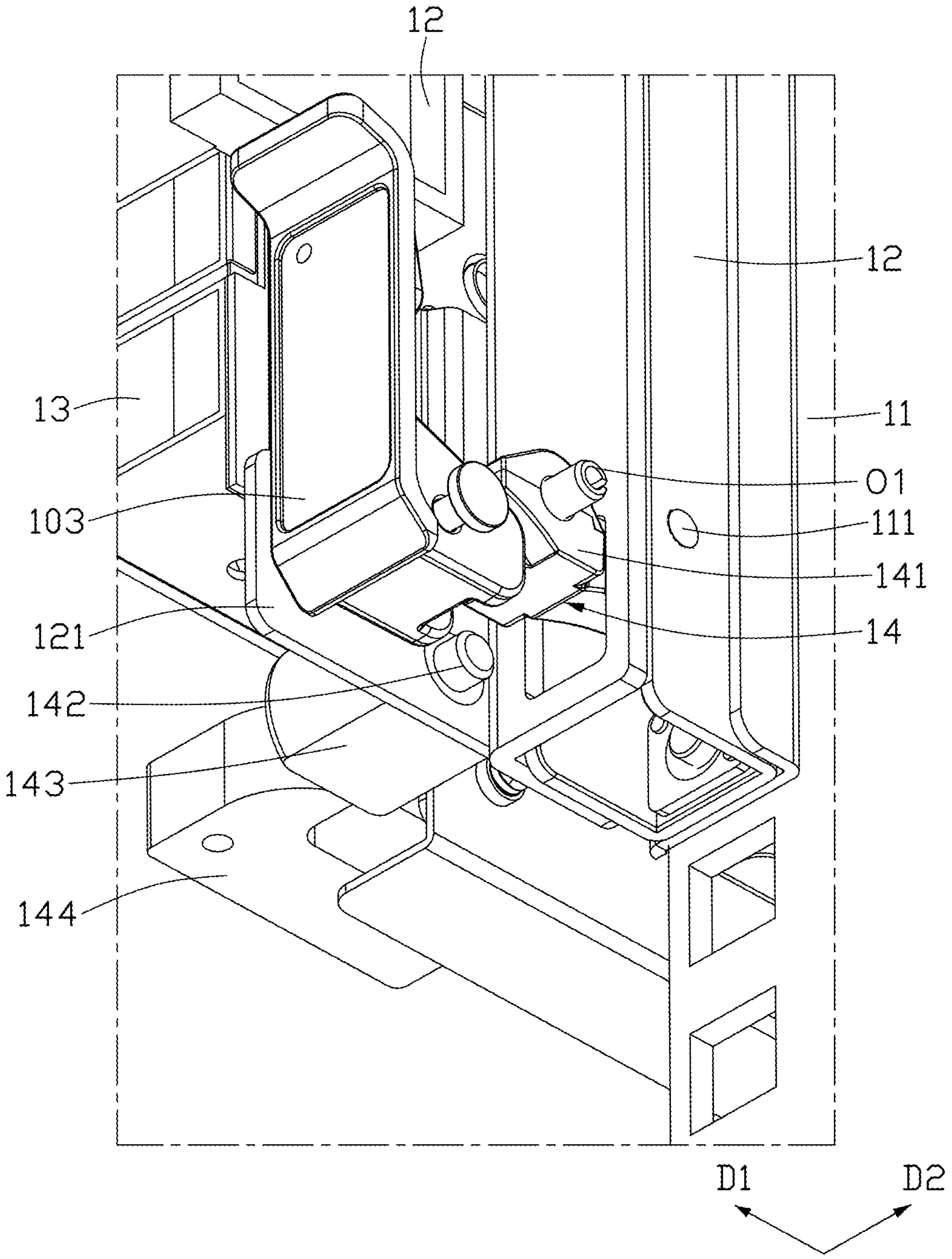
FIG. 2 is a partial schematic diagram of a locking mechanism applied to the chassis and the cabinet of an embodiment of the present application.

In some embodiments, referring to FIG. 2, the cabinet 10 further includes a locking mechanism 14, the locking mechanism 14 is used to lock the cabinet body 11 and the chassis 12, thereby restricting the chassis 12 from being withdrawn from the cabinet body 11 in an undesired situation. In some embodiments, the undesired situation refers to a situation where the drawer module 13 has been withdrawn from the chassis 12.

In some embodiments, referring to FIG. 2, the locking mechanism 14 includes a first rotating member 141, the first rotating member 141 is rotationally disposed in the chassis 12, the first rotating member 141 is abutted against the cabinet body 11, and a rotation plane of the first rotating member 141 is parallel to the first direction D1.

The state in which the first rotating member 141 abuts against the cabinet body 11 is a locked state, and in the locked state, the chassis 12 is restricted from being withdrawn from the cabinet body 11. The first rotating member 141 is separated from the cabinet body 11 during rotation, and the state in which the first rotating member 141 is separated from the cabinet body 11 is an unlocked state, and in the unlocked state, the chassis 12 is allowed to be withdrawn from the cabinet body 11.

In some embodiments, referring to FIG. 2, the locking mechanism 14 further includes a locking member 142, the locking member 142 is movably disposed in the chassis 12 along a second direction D2 to be located in or away from the rotation path of the first rotating member 141, the second direction D2 is orthogonal to the rotation plane of the first rotating member 141.

In some embodiments, when the drawer module 13 is withdrawn from the chassis 12, the first rotating member 141 is abutted against the cabinet body 11, and the locking member 142 is located on the rotation path of the first rotating member 141, and the cabinet body 11 cooperates with the locking member 142 to limit the rotation of the first rotating member 141.

Before the drawer module 13 is withdrawn from the chassis 12, the chassis 12 can be withdrawn normally from the cabinet body 11 by causing the first rotating member 141 to rotate and separate from the cabinet body 11. After the drawer module 13 is withdrawn from the chassis 12, the first rotating member 141 is abutted against the cabinet body 11 and the locking member 142 is located on the rotation path of the first rotating member 141, and the cabinet body 11 cooperates with the locking member 142 to limit the rotation of the first rotating member 141. At this time, the first rotating member 141 is restricted to rotate and cannot be changed from a locked state to an unlocked state, and the chassis 12 is restricted from being withdrawn from the cabinet body 11, so that the center of gravity of the chassis 12 and the drawer module 13 as a whole is closer to the cabinet body 11, which is conducive to reducing the possibility of deformation or even fracture damage to the cabinet 10 when in use.

In some embodiments, referring to FIG. 1, the cabinet body 11 is provided with a first slide rail 101, and the chassis 12 is slidably disposed on the first slide rail 101. The first slide rail 101 facilitates a smoother withdrawal of the chassis 12 from the cabinet body 11.

In some embodiments, after the drawer module 13 is withdrawn from the chassis 12, by restricting the chassis 12 from being withdrawn from the cabinet body 11, it is beneficial to make the center of gravity of the chassis 12 and the drawer module 13 closer to the cabinet body 11, thereby reducing the possibility of deformation of the first slide rail 101.

In some embodiments, the chassis 12 is provided with a second slide rail 102, the drawer module 13 is slidably disposed on the second slide rail 102. The second slide rail 102 facilitates a smoother withdrawal of the drawer module 13 from the chassis 12.

Figure 3:
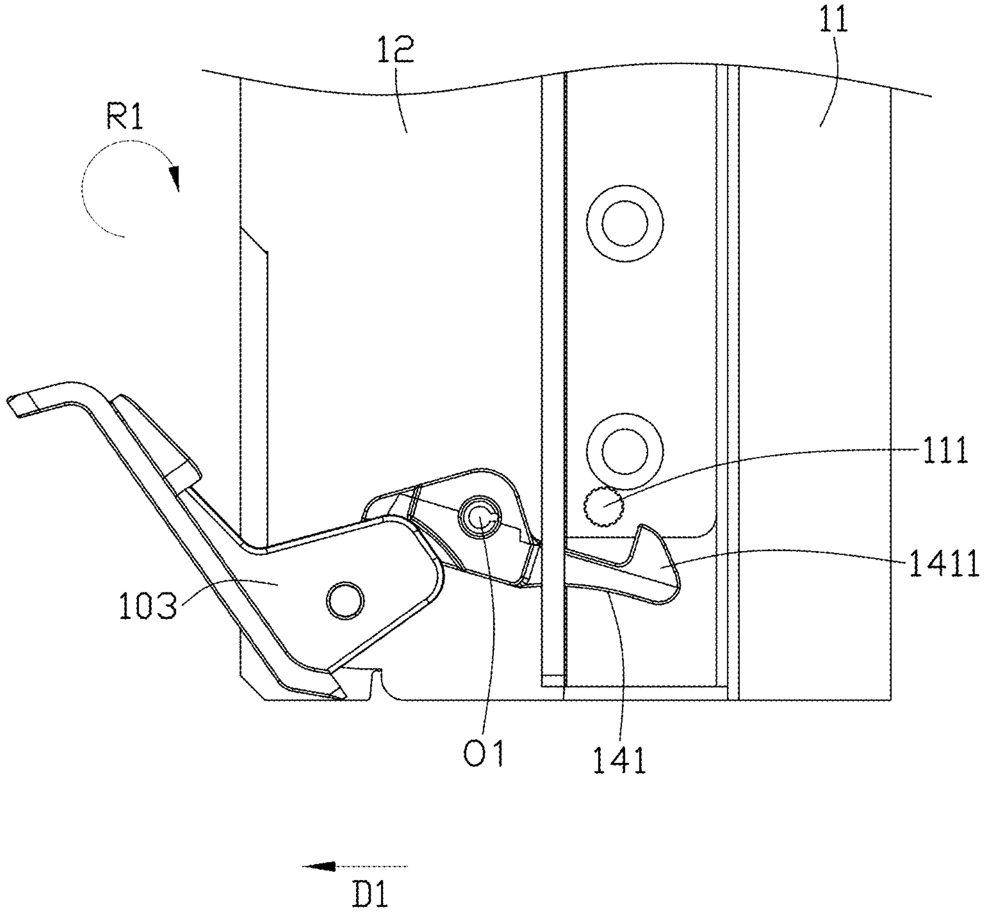
FIG. 3 is a schematic diagram of an unlocked state of an embodiment of the present application.

In some embodiments, by limiting the rotation of the first rotating member 141 to limit the withdrawal of the chassis 12 from the cabinet body 11. Referring to FIG. 3, the first rotating member 141 rotates relative to the chassis 12 along a first rotation direction R1 at the first rotation center O1. The first rotation center O1 is a rotation center of the first rotating member 141. When the first rotating member 141 rotates in the first rotation direction R1 until it no longer contacts the cabinet body 11, the first rotating member 141 can rotate in an opposite direction of the first rotation direction R1 until it re contacts the cabinet body 11.

In some embodiments, referring to FIG. 3, the chassis 12 is provided with an auxiliary member 103, the auxiliary member 103 is configured to drive the first rotating member 141 to rotate. One end of the first rotating member 141 is abutted against the cabinet body 11, and another end of the first rotating member 141 is abutted against the auxiliary member 103.

In some embodiments, the first rotating member 141 has a tendency to rotate in the opposite direction along the first rotation direction R1, which is beneficial for maintaining contact between the first rotating member 141 and the cabinet body 11.

In some embodiments, the end of the first rotating member 141 against the auxiliary member 103 is heavier than the end of the first rotating member 141 against the cabinet body 11, which is beneficial for reducing the occurrence of unexpected rotation of the first rotating member 141 under its own gravity.

In some embodiments, the auxiliary member 103 protrudes from the chassis 12 along the first direction D1, which facilitates providing a gripping position for the operator, thereby facilitating the operator to rotate the first rotating member 141 by means of the auxiliary member 103, or to withdraw the chassis 12 from the cabinet body 11 along the first direction D1.

In some embodiments, the auxiliary member 103 is rotated in the reverse direction along the first direction of rotation R1, and the first rotating member 141 is abutted against the auxiliary member 103 and the first rotating member 141 is located in the rotation path of the auxiliary member 103.

Figure 4:
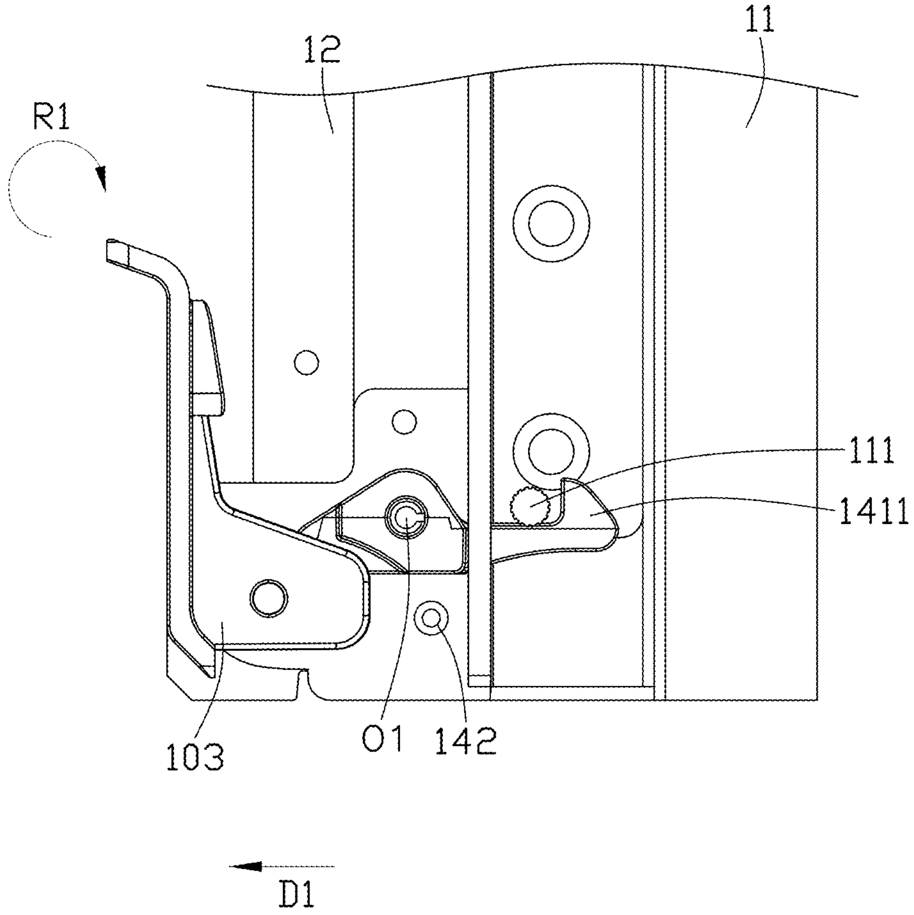
FIG. 4 is a schematic diagram of a locked state of an embodiment of the present application.

In some embodiments, referring to FIG. 4, the cabinet body 11 includes a first limiting portion 111, the first rotating member 141 includes a second limiting portion 1411, and the first limiting portion 111 is abutted against the second limiting portion 1411.

In some embodiments, referring to FIG. 4, before the first rotating member 141 is rotated, along the first direction D1, there is an overlap between the projection of the second limiting portion 1411 and the projection of the first limiting portion 111. At this time, the chassis 12 is restricted from being withdrawn from the cabinet body 11.

In some embodiments, referring to FIG. 3, after the first rotating member 141 is rotated in the first rotation direction R1, the second limiting portion 1411 moves away from the first limiting portion 111. Along the first direction D1, the projection of the second limiting portion 1411 does not overlap with the projection of the first limiting portion 111. At this time, the chassis 12 is allowed to be withdrawn from the cabinet body 11.

Figure 5:
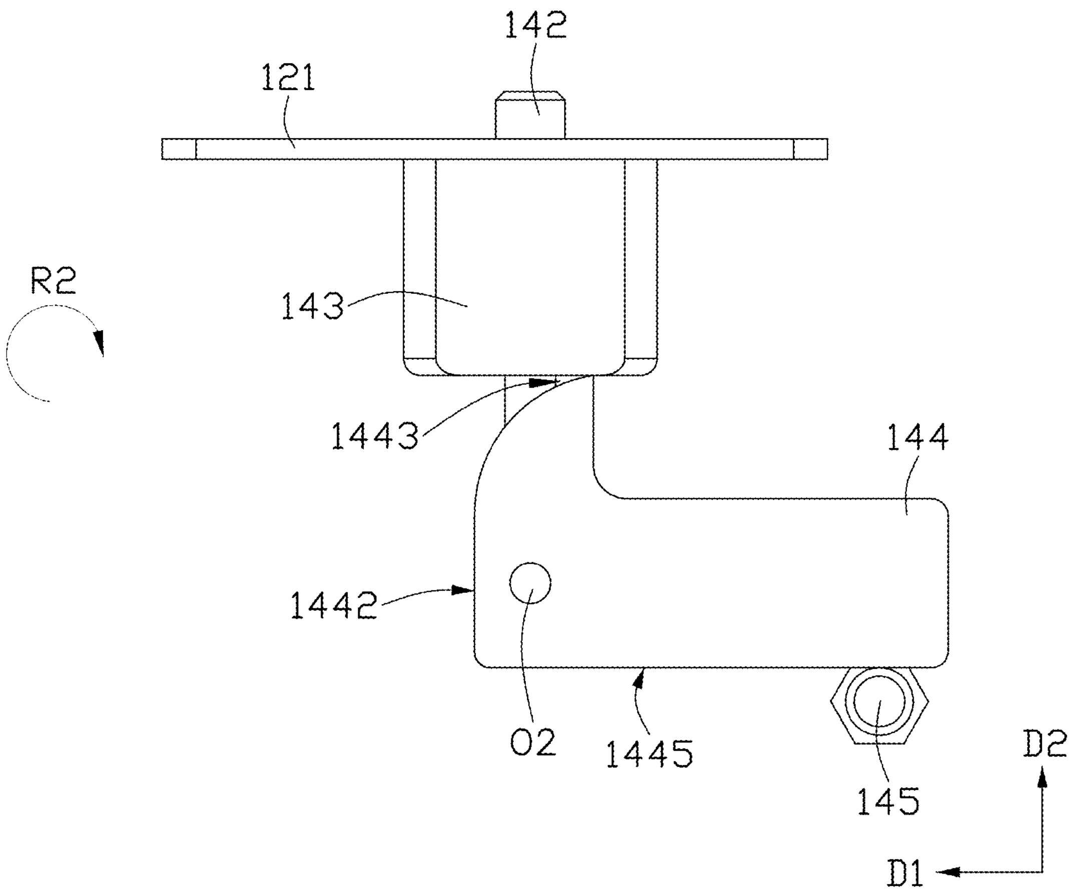
FIG. 5 is a schematic diagram of a first state where a movable member against a second rotating member of an embodiment of the present application.

In some embodiments, the cabinet body 11 cooperating with the locking member 142 to limit the rotation of the first rotating member 141 can be seen in FIG. 5, at this time, the rotation of the first rotating member 141 along the first direction of rotation R1 is stopped by the locking member 142, and the reverse rotation of the first rotating member 141 along the first direction of rotation R1 is stopped by the first limiting portion 111. In this case, the first limiting portion 111 cooperates with the locking member 142 to limit the rotation of the first rotating member 141 so that the chassis 12 is limited to being withdrawn from the cabinet body 11.

In some embodiments, referring to FIG. 2, the locking mechanism 14 further includes a fixing member 143, and the fixing member 143 is fixed to the chassis 12. The fixing member 143 defines a channel 1431 that runs through along the second direction D2 (shown in FIG. 8), and the locking member 142 is movably disposed in the channel 1431. The channel 1431 may facilitate guidance of the movement of the locking member 142 in the second direction D2, thereby improving the accuracy of the rotation path of the locking member 142 located at or away from the first rotating member 141.

In some embodiments, when the locking member 142 is located at the rotation path of the first rotating member 141, the locking member 142 extends out of the channel 1431.

In some embodiments, referring to FIG. 2, the chassis 12 includes a fixing portion 121, and the fixing portion 121 is used to fix the fixing member 143.

In some embodiments, the fixing member 143 is fixed to the fixing portion 121 by bonding, welding, screwing or snap-fitting, etc.

In some embodiments, referring to FIG. 2, the locking mechanism 14 further includes a second rotating member 144, the second rotating member 144 is rotationally connected to the locking member 142 and the second rotating member 144 is abutted against the fixing member 143, the rotation plane of the second rotating member 144 is parallel to the second direction D2.

In some embodiments, the locking member 142 defines a first through hole 1421, the second rotating member 144 defines a second through hole 1441, the locking mechanism 14 is provided with a connecting member 104, the connecting member 104 is threaded through the second through hole 1441 and the first through hole 1421, facilitating the rotational connection of the second rotating member 144 with the locking member 142.

The second rotating member 144 is used to drive the locking member 142 along or away from the rotation path of the first rotating member 141 during the rotation process. The use of the second rotating member 144 is beneficial for improving the convenience of the locking member 142 in the rotation path located at or away from the first rotating member 141.

Figure 6:
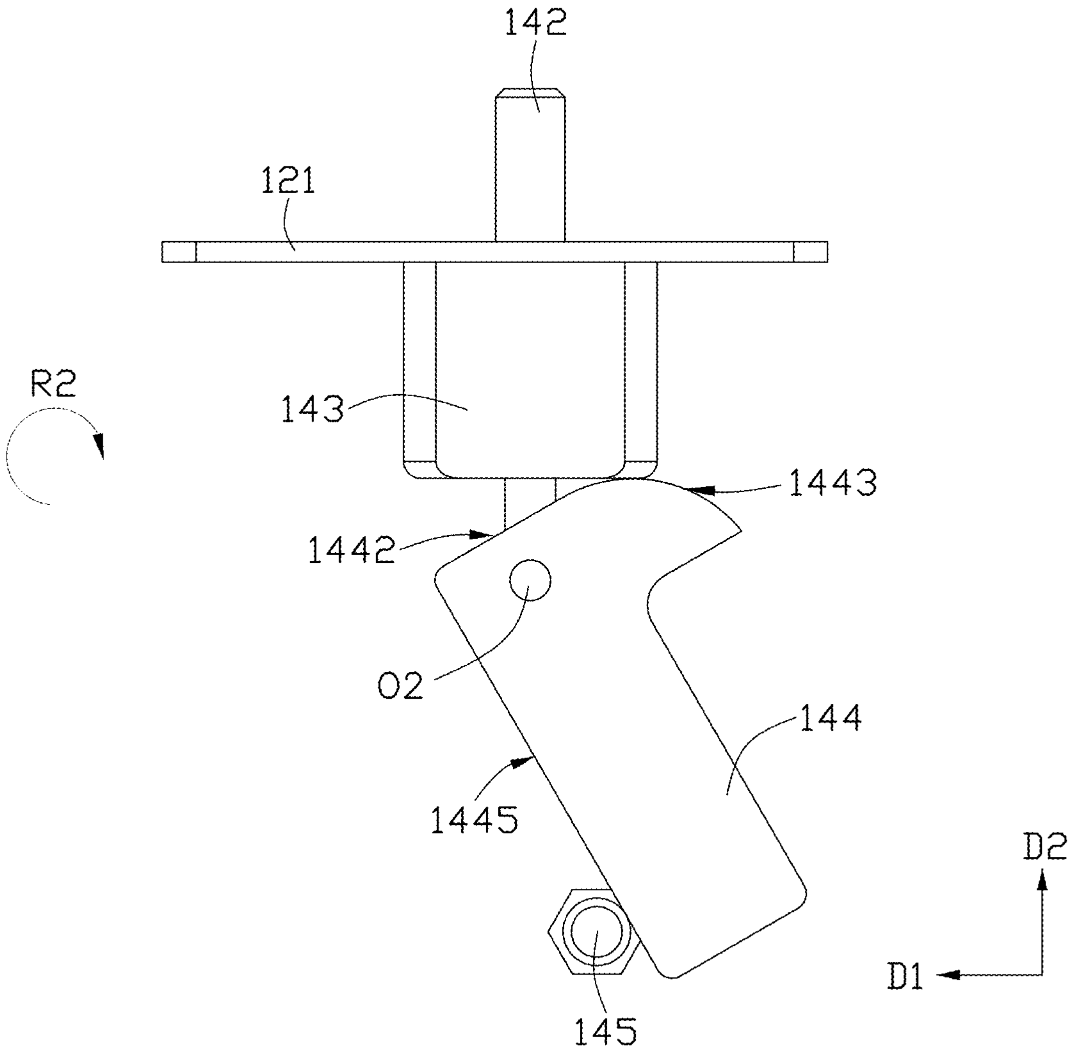
FIG. 6 is a schematic diagram of a second state where the movable member against the second rotating member of an embodiment of the present application.
Figure 7:
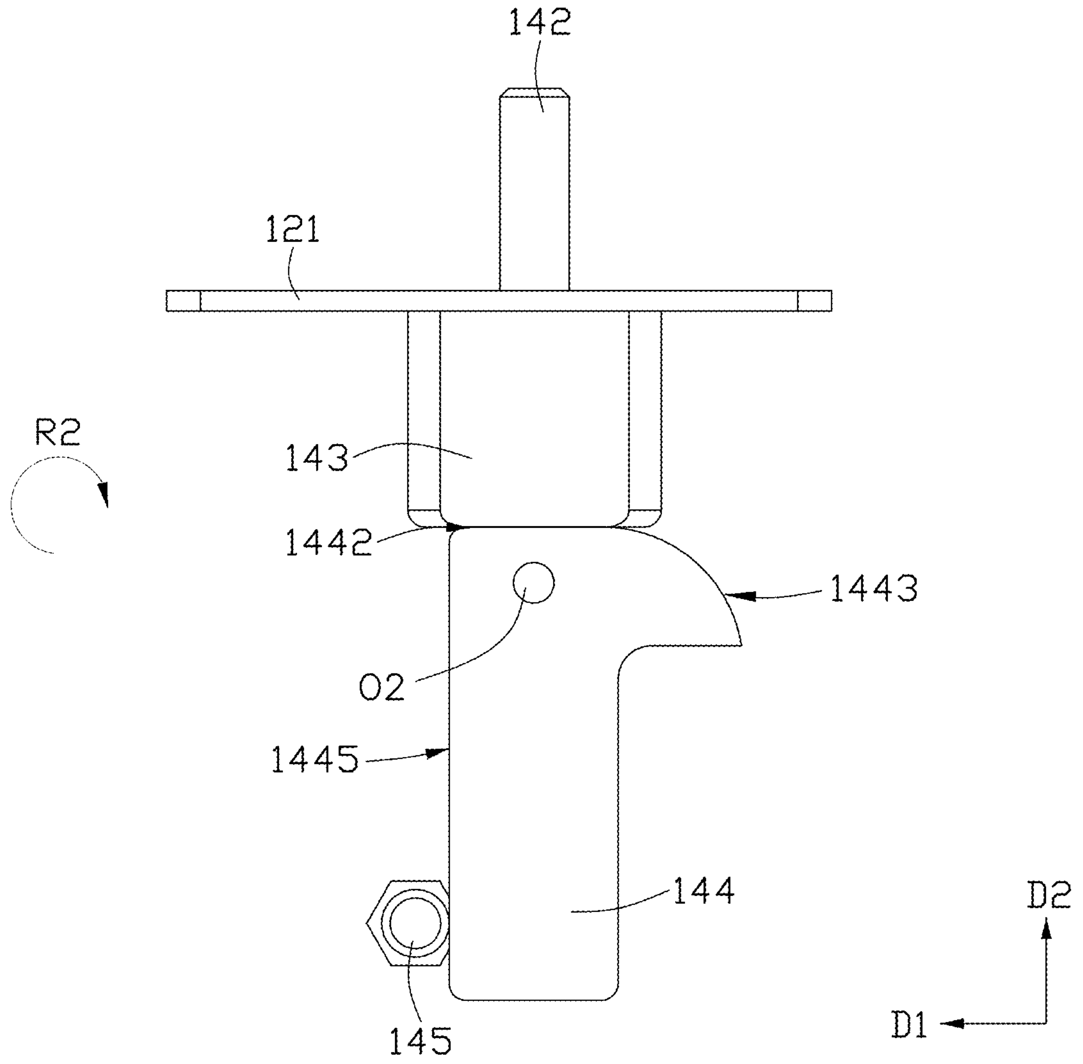
FIG. 7 is a schematic diagram of a third state where the movable member against the second rotating member of an embodiment of the present application.

Referring to FIGS. 5 to 7, the second rotating member 144 rotates along the second rotation direction R2 with the second rotation center O2 as the axis, the second rotation center O2 is the rotation center of the second rotating member 144.

In some embodiments, the rotation center of the second rotating member 144 is located at a rotation connection between the second rotating member 144 and the locking member 142. In some embodiments, the rotation center of the second rotating member 144 coincides with the second through hole 1441.

The rotation center of the second rotating member 144 is used to move closer to the fixing member 143 along the second direction D2 or away from the fixing member 143 along the reverse direction of the second direction D2 during rotation of the second rotating member 144. During the rotation of the second rotating member 144, it is possible to move closer to or away from the fixing member 143, which facilitates convenient movement of the locking member 142 along the second direction D2 or reverse movement of the second direction D2.

More specifically, when the second rotating member 144 is rotated in the second direction of rotation R2, the rotation center of the second rotating member 144 moves closer to the fixing member 143 along the first direction D1. When the second rotating member 144 is rotated in the reverse direction of the second direction of rotation R2, the rotation center of the second rotating member 144 moves away from the fixing member 143 in the reverse direction of the first direction D1.

In some embodiments, referring to FIGS. 5 to 8, the second rotating member 144 includes a first wall 1442 and a second wall 1443, and the first wall 1442 is connected the second wall 1443.

The first wall 1442 and the second wall 1443 are used to abut against the fixing member 143 during the rotation of the second rotating member 144. The distance between the first wall 1442 and the rotation center of the second rotating member 144 is less than the distance between the second wall 1443 and the rotation center of the second rotating member 144. Compared to the rotation center of the second rotating member 144 when the second wall 1443 abuts against the fixing member 143 (shown in FIG. 5), the rotation center of the second rotating member 144 is closer to the fixing member 143 when the first wall 1442 abuts against the fixing member 143, and the locking member 142 extends a longer length from the fixing member 143 (shown in FIG. 7). By alternating the second wall 1443 and the first wall 1442 against the fixing member 143, it is advantageous to conveniently move the rotation center of the second rotating member 144 close to or away from the fixing member 143, which in turn facilitates the adjustment of the length of the locking member 142 extending out of the fixing member 143, so that the locking member 142 is conveniently located in or away from the rotation path of the first rotating member 141.

In some embodiments, the first wall 1442 is a planar, and when the first wall 1442 abuts against the fixing member 143, the first wall 1442 abuts the fixing member 143. In this case, it is beneficial to maintain a stable relative position between the second rotating member 144 and the fixing member 143, and the locking member 142 can be stably located in the rotation path of the first rotating member 141, thereby contributing to the stability of the chassis 12 being constrained to be withdrawn from the cabinet body 11.

In some embodiments, the second wall 1443 is curved surface and the second wall 1443 is smoothly connected to the first wall 1442. On one hand, when the second wall 1443 is abutted against the fixing member 143, it is easy to make a shift towards the first wall 1442 being abutted against the fixing member 143, which is beneficial for the locking member locking member 142 to quickly position in the rotation path of the first rotating member first rotating member 141, thereby facilitating the timeliness with which the chassis 12 is constrained to be withdrawn from the cabinet body 11. On another hand, in the process of the second wall 1443 and the first wall 1442 alternately abutting against the fixing member 143, it is beneficial to reduce wear on the fixing member 143.

Figure 8:
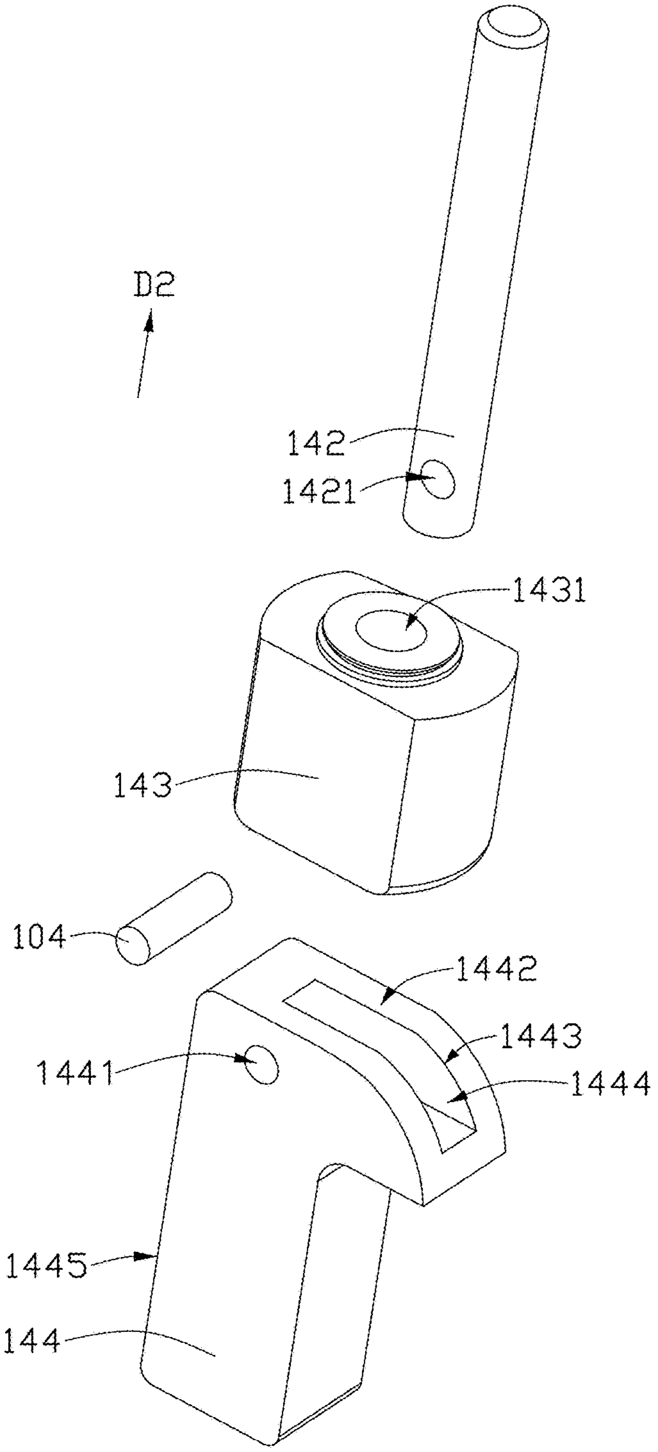
FIG. 8 is an exploded view of the locking component, the fixing member, and the second rotating member of an embodiment of the present application.

In some embodiments, referring to FIG. 8, the second rotating member 144 defines a groove 1444, and the groove 1444 is used to accommodate a part of the locking member 142 during the rotation of the second rotating member 144. Since the second rotating member 144 requires a certain amount of space to carry out the rotation, it is beneficial to make the overall structure of the locking member 142 and the second rotating member 144 more compact by means of the groove 1444, and the groove 1444 can form a protection for the location where the second rotating member 144 is rotationally connected to the locking member 142, which is conducive to improving the structural stability of the locking mechanism 14.

In some embodiments, the groove 1444 runs through the first wall 1442 and the second wall 1443.

In some embodiments, the first wall 1442 and the second wall 1443 are sequentially connected along the second rotation direction R2. Before the drawer module 13 is withdrawn from the chassis 12, the second wall 1443 abuts against the fixing member 143; after the drawer module 13 is withdrawn from the chassis 12, the first wall 1442 abuts against the fixing member 143.

In some embodiments, referring to FIGS. 5 to 7, the locking mechanism 14 includes a movable member 145, the movable member 145 is disposed in the drawer module 13 and the movable member 145 is abutted against the second rotating member 144. When the drawer module 13 is withdrawn from the chassis 12 along the first direction D1, the movable member 145 moves in a straight line along the first direction D1; when the drawer module 13 is pushed into the chassis 12 along the reverse direction of the first direction D1, the movable member 145 moves in a straight line along the reverse direction of the first direction D1.

In some embodiments, when the drawer module 13 is withdrawn from the chassis 12, the movable member 145 rotates the second rotating member 144, so that the locking member 142 is located at the rotation path of the first rotating member 141. In some embodiments, when the drawer module 13 is pushed into the chassis 12, the movable member 145 rotates the second rotating member 144 to move the locking member 142 away from the rotation path of the first rotating member 141. After withdrawing the drawer module 13 from the chassis 12, the movable member 145 can enable the locking member 142 to be located in the rotation path of the first rotating member 141, which is conducive to conveniently restricting the rotation of the first rotating member 141 and is able to quickly restrict the chassis 12 from being mistakenly withdrawn from the cabinet body 11, thereby conducive to further reducing the possibility of deformation or even fracture and damage of the cabinet 10 when in use.

In some embodiments, referring to FIGS. 5 to 8, the second rotating member 144 further includes a third wall 1445, the first wall 1442 is connected to the second wall 1443 and the third wall 1445, and the movable member 145 is abutted against an end of the third wall 1445 away from the first wall 1442.

In some embodiments, the third wall 1445, the first wall 1442 and the second wall 1443 are sequentially connected along the second rotation direction R2.

Keeping the chassis 12 in the cabinet body 11, when the drawer module 13 is withdrawn from the chassis 12, the state of the movable member 145 against the second rotating member 144 is shown in the variations of FIGS. 5 to 7. Referring to FIG. 5, before the drawer module 13 is withdrawn from the chassis 12, the second wall 1443 is abutted against the fixing member 143 to move the rotation center of the second rotating member 144 away from the fixing member 143, so that the locking member 142 extends out of the fixing member 143 for a shorter length, and the locking member 142 is moved away from the rotation path of the first rotating member 141. The movable member 145 is abutted against an end of the third wall 1445 away from the first wall 1442, along the second rotation direction R2, and the movable member 145 is disposed in the rotation path of the second rotating member 144 to limit rotation of the second rotating member 144 along the second rotation direction R2. Referring to FIG. 6, during the withdrawal of the drawer module 13 from the chassis 12, the movable member 145 moves in a straight line along the first direction D1, the third wall 1445 remains against the movable member 145, and the second rotating member 144 rotates along the second rotation direction R2, and the second rotating member 144 is gradually transformed from the second wall 1443 against the fixing member 143 to the first wall 1442 against the fixing member 143. Referring to FIG. 7, after the drawer module 13 is withdrawn from the chassis 12, the first wall 1442 is abutted against the fixing member 143 to bring the rotation center of the second rotating member 144 closer to the fixing member 143, so that the locking member 142 extends out of the fixing member 143 for a longer length, and the locking member 142 is located in the rotation path of the first rotating member 141, and the chassis 12 is restricted to be withdrawn from the cabinet body 11.

When the drawer module 13 is in the withdrawn state, by pushing the drawer module 13 into the chassis 12, the movable member 145 moves in a reverse straight line along the first direction D1, the movable member 145 abuts against the third wall 1445 and exerts a force on the third wall 1445, and the force can be decomposed into a centripetal force and a tangential force on the second rotating member 144, and by means of the tangential force, the movable member 145 can drive the second rotating member 144 to rotate in the reverse direction along the second rotation direction R2, so that the second rotating member 144 is gradually transformed from the first wall 1442 against the fixing member 143 to the second wall 1443 against the fixing member 143.

In some embodiments, from the end of the third wall 1445 away from the first wall 1442 to the end of the third wall 1445 proximate the first wall 1442, the distance between the third wall 1445 and the rotation center of the second rotating member 144 gradually increases along the second direction D2. In this case, from the end of the third wall 1445 away from the first wall 1442 to the end of the third wall 1445 close to the first wall 1442, the third wall third wall 1445 is gradually close to the path in which the movable member 145 is moving linearly in the first direction D1, which facilitates the continual exertion of the force on the second rotating member 144 through the third wall 1445 when the movable member 145 is moving linearly in the first direction D1, and the force can be decomposed into a centripetal force and a tangential force on the second rotating member 144, so that the tangential force facilitates the movable member 145 to conveniently rotate the second rotating member 144.

In some embodiments, along the second direction D2, the rotation center of the second rotating member 144 is offset from the center of gravity of the second rotating member 144, and the second direction D2 is the reverse direction of the direction of gravity. When the movable member 145 is moved in the first direction D1, the second rotating member 144 will rotate under gravity, which helps to reduce the wear and tear of the movable member 145 on the second rotating member 144.

The process of using the cabinet 10 of the present application is as follows:

Before the drawer module 13 is withdrawn from the chassis 12 and the chassis 12 is withdrawn from the cabinet body 11, the second wall 1443 of the second rotating member 144 is abutted against the fixing member 143 to keep the locking member 142 away from the rotation path of the first rotating member 141, and the first rotating member 141 is allowed to rotate. The first rotating member 141 is rotated by operating the auxiliary member 103, so that the first rotating member 141 is separated from the cabinet body 11, and the whole of the chassis 12 and the drawer module 13 is withdrawn from the cabinet body 11 in the unlocked state.

Before the chassis 12 is withdrawn from the cabinet body 11, the drawer module 13 is withdrawn from the chassis 12, and the first wall 1442 of the second rotating member 144 is abutted against the fixing member 143, so that the locking member 142 is located at the rotation path of the first rotating member 141, the locking member 142 cooperates with the chassis 12 to restrict rotation of the first rotating member 141, so that the chassis 12 is restricted from being withdrawn from the cabinet body 11 after the drawer module 13 is withdrawn from the chassis 12.

Even though numerous characteristics and advantages of the present technology have been set forth in the foregoing description, together with details of the structure and function of the present application, the application is illustrative only, and changes can be made in the detail, especially in matters of shape, size, and arrangement of the parts within the principles of the present application, up to and including the full extent established by the broad general meaning of the terms used in the claims. It will, therefore, be appreciated that the exemplary embodiments described above can be modified within the scope of the claims.

What is claimed is:

1. A cabinet comprising a cabinet body, a chassis, a drawer module, and a locking mechanism, wherein:

the chassis is disposed in the cabinet body, and the chassis is withdrawable from the cabinet body along a first direction;

the drawer module is disposed in the chassis, and the drawer module is withdrawable from the chassis along the first direction; and the locking mechanism comprises a first rotating member and a locking member, the first rotating member is rotationally disposed in the chassis and the first rotating member abuts against the cabinet body, a rotation plane of the first rotating member is parallel to the first direction; the locking member is movably disposed in the chassis along a second direction to be located in or away from a rotation path of the first rotating member, and the second direction is orthogonal to the rotation plane of the first rotating member;

the cabinet is in a locked state when the first rotating member is against the cabinet, the chassis is restricted from being withdrawn from the cabinet body; and the first rotating member is separated from the cabinet body during rotation; and the cabinet is in an unlocked state when the first rotating member is separated from the cabinet body, the chassis can be withdrawn from the cabinet body; when the drawer module is withdrawn from the chassis, the first rotating member abuts against the cabinet body, the locking member is located in the rotation path of the first rotating member, and the cabinet body cooperates with the locking member to limit rotation of the first rotating member;

the locking mechanism further comprises a fixing member and a second rotating member, the fixing member is fixed to the chassis, the second rotating member is rotatably connected to the locking member and the second rotating member abuts against the fixing member, a rotation center of the second rotating member is located at a rotation connection between the second rotating member and the locking member, the rotation center of the second rotating member is configured to move closer to the fixing member along the second direction or to move away from the fixing member along a opposite direction of the second direction during rotation of the second rotating member.

2. The cabinet according to claim 1, wherein the fixing member defines a channel that extends along the second direction, and the locking member is movably disposed in the channel.

3. The cabinet according to claim 2, wherein a rotation plane of the second rotating member is parallel to the second direction, the second rotating member is configured to drive the locking member to be located in or away from the rotation path of the first rotating member during rotation.

4. The cabinet according to claim 3, wherein the locking mechanism further comprises a movable member, the movable member is disposed on the drawer module, the movable member abuts against the second rotating member, the movable member is configured to drive the second rotating member to rotate when the drawer module is withdrawn from the chassis, such that the locking member is located in the rotation path of the first rotating member; or the movable member is configured to drive the second rotating member to rotate when the drawer module is pushed into the chassis, such that the locking member is located away from the rotation path of the first rotating member.

5. The cabinet according to claim 4, wherein along the second direction, a rotation center of the second rotating member is offset from a center of gravity of the second rotating member, and the second direction is opposite to a gravity direction.

6. The cabinet according to claim 3, wherein the second rotating member comprises a first wall and a second wall connected to the first wall, the first wall and the second wall are configured to abut against the fixing member during rotation of the second rotating member; and a first distance between the first wall and the rotation center of the second rotating member is less than a second distance between the second wall and the rotation center of the second rotating member.

7. The cabinet according to claim 6, wherein the first wall is a planar wall and the first wall abuts the fixing member when the first wall adheres to the fixing member.

8. The cabinet according to claim 6, wherein the second wall is a curved surface, and the second wall is connected to the first wall.

9. The cabinet according to claim 3, wherein the second rotating member defines a groove, and the groove is configured to accommodate a part of the locking member during rotation of the second rotating member.

10. A cabinet comprising a cabinet body, a chassis, a drawer module, and a locking mechanism, wherein:

the chassis is disposed in the cabinet body, and the chassis is withdrawable from the cabinet body along a first direction;

the drawer module is disposed in the chassis, and the drawer module is withdrawable from the chassis along the first direction; and the locking mechanism comprises a first rotating member and a locking member, the first rotating member is rotationally disposed in the chassis and the first rotating member is abutted against the cabinet body, a rotation plane of the first rotating member is parallel to the first direction; the locking member is movably disposed in the chassis along a second direction to be located in or away from a rotation path of the first rotating member, and the second direction is orthogonal to the rotation plane of the first rotating member;

the cabinet is in a locked state when the first rotating member is against the cabinet, the chassis is restricted from being withdrawn from the cabinet body; the first rotating member is separated from the cabinet body during rotation; and the cabinet is in an unlocked state when the first rotating member is separated from the cabinet body, and the chassis is allowed to be withdrawn from the cabinet body; and when the drawer module is withdrawn from the chassis, the first rotating member abuts against the cabinet body, the locking member is located in the rotation path of the first rotating member, and the cabinet body cooperates with the locking member to limit rotation of the first rotating member;

wherein the cabinet body is provided with a first slide rail, and the chassis is slidably disposed on the first slide rail;

the locking mechanism further comprises a fixing member and a second rotating member, the fixing member is fixed to the chassis, the second rotating member is rotatably connected to the locking member and the second rotating member abuts against the fixing member, a rotation center of the second rotating member is located at a rotation connection between the second rotating member and the locking member, the rotation center of the second rotating member is configured to move closer to the fixing member along the second direction or to move away from the fixing member along a opposite direction of the second direction during rotation of the second rotating member.

11. The cabinet according to claim 10, wherein the fixing member defines a channel that extends along the second direction, and the locking member is movably disposed in the channel.

12. The cabinet according to claim 11, wherein a rotation plane of the second rotating member is parallel to the second direction, the second rotating member is configured to drive the locking member to be located in or away from the rotation path of the first rotating member during rotation.

13. The cabinet according to claim 12, wherein the locking mechanism further comprises a movable member, the movable member is disposed on the drawer module, the movable member abuts against the second rotating member, the movable member is configured to drive the second rotating member to rotate when the drawer module is withdrawn from the chassis, such that the locking member is located in the rotation path of the first rotating member; or the movable member is configured to drive the second rotating member to rotate when the drawer module is pushed into the chassis, such that the locking member is located away from the rotation path of the first rotating member.

14. The cabinet according to claim 13, wherein along the second direction, a rotation center of the second rotating member is offset from a center of gravity of the second rotating member, and the second direction is opposite to a gravity direction.

15. The cabinet according to claim 12, wherein the second rotating member comprises a first wall and a second wall connected to the first wall, the first wall and the second wall are configured to abut against the fixing member during rotation of the second rotating member; and a first distance between the first wall and the rotation center of the second rotating member is less than a second distance between the second wall and the rotation center of the second rotating member.

16. The cabinet according to claim 15, wherein the first wall is a planar wall and the first wall abuts the fixing member when the first wall adheres to the fixing member.

17. The cabinet according to claim 15, wherein the second wall is a curved surface, and the second wall is connected to the first wall.

18. The cabinet according to claim 12, wherein the second rotating member defines a groove, and the groove is configured to accommodate a part of the locking member during rotation of the second rotating member.

* * * * *